(12) United States Patent
Marvin

(10) Patent No.: US 6,491,194 B2
(45) Date of Patent: Dec. 10, 2002

(54) CELL PHONE HOLDER FOR MOTOR VEHICLES

(76) Inventor: Ernest Marvin, 115 Magnolia Ct., Luling, LA (US) 70070

( * ) Notice: Subject to any disclaimer, the term of this patent is extended or adjusted under 35 U.S.C. 154(b) by 0 days.

(21) Appl. No.: 09/770,654

(22) Filed: Jan. 29, 2001

(65) Prior Publication Data

US 2002/0100782 A1 Aug. 1, 2002

(51) Int. Cl.⁷ .................................................. H04M 1/04
(52) U.S. Cl. ........................ 224/483; 224/247; 224/571; 224/901.8; 224/929; 248/313; 379/446
(58) Field of Search .................................. 224/929, 930, 224/901.8, 483, 247, 248, 678, 679, 539, 543, 571; 455/100; 379/446; D3/218; D14/240, 251, 253; 248/316.6, 316.7, 316.8, 310, 311.2, 313

(56) References Cited

U.S. PATENT DOCUMENTS

| | | | | |
|---|---|---|---|---|
| 1,403,707 A | * | 1/1922 | Quarnstrom | 224/247 |
| 1,611,275 A | * | 12/1926 | Lewis | 224/247 |
| 1,756,677 A | * | 4/1930 | Cook | 206/3 |
| 3,033,405 A | * | 5/1962 | Adell | 248/313 |
| 4,406,928 A | * | 9/1983 | MacKenzie | 379/454 |
| D279,342 S | * | 6/1985 | Crawford | 224/247 |
| 4,577,788 A | | 3/1986 | Richardson | |
| 4,606,523 A | * | 8/1986 | Statz et al. | 248/311.2 |
| 4,708,273 A | * | 11/1987 | Grant | 224/678 |
| 4,779,831 A | * | 10/1988 | Anderson | 248/311.2 |
| 4,846,382 A | | 7/1989 | Foultner et al. | |
| 4,948,022 A | * | 8/1990 | VanDyke | 206/308.1 |
| D316,999 S | | 5/1991 | Sarff | |
| D317,157 S | * | 5/1991 | Jondelius | D14/253 |
| 5,013,074 A | * | 5/1991 | Galle | 248/145.6 |
| D320,022 S | | 9/1991 | Watanabe et al. | |
| D320,992 S | | 10/1991 | Jondelius | |
| 5,060,260 A | | 10/1991 | O'Connell | |
| D322,719 S | | 12/1991 | Jayez | |
| D328,078 S | | 7/1992 | Jacobs | |
| 5,131,036 A | | 7/1992 | Dunchock | |
| 5,222,132 A | * | 6/1993 | Rioux, Jr. | 248/214 |
| 5,240,156 A | * | 8/1993 | Sicotte et al. | 224/148.5 |
| 5,249,770 A | * | 10/1993 | Louthan | 248/313 |
| 5,305,381 A | | 4/1994 | Wang et al. | |
| 5,457,745 A | * | 10/1995 | Wang | 379/426 |
| 5,471,530 A | | 11/1995 | Chen | |
| D365,566 S | | 12/1995 | Cantrell | |
| 5,529,271 A | | 6/1996 | Dunchock | |
| D377,798 S | | 2/1997 | Heine | |
| 5,711,469 A | | 1/1998 | Gormley et al. | |
| D390,849 S | * | 2/1998 | Richter et al. | D14/253 |
| D395,545 S | * | 6/1998 | Crim, Jr. | D3/218 |
| 5,778,063 A | | 7/1998 | Dunchock | |
| 5,833,100 A | | 11/1998 | Kim | |
| 5,897,040 A | | 4/1999 | Ward | |
| 5,961,016 A | * | 10/1999 | Hartmann et al. | 224/539 |
| 6,036,071 A | * | 3/2000 | Hartmann et al. | 224/483 |
| 6,311,881 B1 | * | 11/2001 | Kamiya | 224/195 |
| 6,427,959 B1 | * | 8/2002 | Kalis et al. | 379/446 |

FOREIGN PATENT DOCUMENTS

| | | |
|---|---|---|
| EP | 933737 | 8/1999 |
| JP | 10-179233 | 7/1998 |
| JP | 11-032285 | 2/1999 |

* cited by examiner

Primary Examiner—Nathan J. Newhouse
(74) Attorney, Agent, or Firm—Richard C. Litman

(57) ABSTRACT

A cell phone holder for motor vehicles provides for placement of a cellular phone at any convenient location desired in a motor vehicle or other area as desired. The present cell phone holder essentially comprises a relatively narrow back or spine portion with opposed upper and lower lateral arms extending therefrom. The arms are open between their facing forward ends, to allow complete access to the cellular phone contained within the holder. The back of the holder includes one portion of hook and loop fabric material thereon, which removably attaches to another portion of mating material which is secured to another surface (automobile dash, etc.) A person wishing to use the phone may easily grasp the phone and withdraw it from the open holder for use as desired. One or more spacers may be provided to adjust for different sizes of phones, as desired.

4 Claims, 4 Drawing Sheets

CELL PHONE HOLDER FOR MOTOR VEHICLES

BACKGROUND OF THE INVENTION

1. Field of the Invention

The present invention relates generally to racks, brackets, and holders and the like for temporarily and removably holding various articles therein, and more specifically to a holder which may be removably secured to a convenient point in the interior of a motor vehicle for removably holding a cellular phone therein. The present invention provides a secure place for holding the phone during travel in the motor vehicle, thereby freeing the driver's hands for full control of the vehicle.

2. Description of the Related Art

Mobile telephones, or more particularly, cellular telephones which operate by automatically selecting appropriate repeater stations depending upon the location of the telephone, have been nearly universally embraced as a convenient means of transportation by many people throughout the U. S. and the world. Cell phones have become popular for discussing business or personal matters in virtually every environment, including during travel in an automobile or other motor vehicle.

However, it is widely recognized that a person using a telephone cannot devote his or her full attention to the telephone conversation or matter, and any other task at hand. This is particularly critical when operating heavy machinery, such as when driving an automobile or other motor vehicle. At such times, it is imperative that nearly all of ones attention be directed to the operation of the machine or vehicle, and that the operator have both hands free to operate the machine or vehicle, rather than having one hand tied up by holding a cell phone. This situation has received sufficient recognition that many jurisdictions are legislating against the use of hand held cell phones by the operator of a motor vehicle, while the vehicle is in motion.

Accordingly, various accessories have been developed to allow the hands free use of cell phones (headsets, etc.). While these devices alleviate the need to hold the telephone close to one's face while conversing on the phone, they do nothing to secure the phone to prevent its movement or temporary dislocation within the vehicle during operation of the vehicle. Many vehicle operators will place their cell phone on the adjacent seat for ease of access while driving, and use a headset for hands free phone operation. Obviously, this is not a workable solution if a passenger is occupying the seat, and in any event does nothing to prevent the phone from sliding from the seat in the event of a sudden maneuver. In fact, many accidents have been caused not solely from the distraction of a cell phone conversation, but from the vehicle driver attempting to retrieve a cell phone which has fallen.

Accordingly, a need will be seen for a cell phone holder for motor vehicles, which temporarily and removably secures a single cell phone therein for convenient access by the vehicle operator or another person in the vehicle. The present holder provides access to the keypad of the phone, and securely retains the phone at all times during vehicle operation. The present cell phone holder is well adapted for hands free use of the phone, and may be quickly and easily removed from the vehicle for use in another vehicle, or in the home, office, or other area as desired.

A discussion of the related art of which the present inventor is aware, and its differences and distinctions from the present invention, is provided below.

U.S. Pat. No. 4,577,788 issued on Mar. 25, 1986 to Jennings R. Richardson, titled "Portable Multipurpose Desk Container," describes a multicompartmented container with multiple lids or covers for different purposes. The Richardson device is relatively complex, and none of the compartments appear suited for placement of a cellular telephone therein, for accessing the keypad of the phone and for extending a headset harness from the phone.

U.S. Pat. No. 4,846,382 issued on Jul. 11, 1989 to Jerry L. Foultner et al., titled "Dash Mounting Device," describes a support for removably securing other articles thereto. The device is wedge shaped with a flat top, to provide a generally level upper surface. However, no container is provided, let alone a container sufficiently small to hold a cell phone securely therein and which may be carried in a pocket or the like when removed from the vehicle.

U.S. Pat. No. 5,060,260 issued on Oct. 22, 1991 to Joseph J. O'Connell, titled "Mounting Cradle For A Portable Cellular Telephone," describes a complex device having a gimballed base to adjust the orientation of the cradle and phone therein as desired. The device is secured by threaded fasteners, rather than the quick release materials used with the present phone holder. Moreover, no positive retention of the phone within the device, is provided. Opposed retaining springs are provided to each side of the phone case, but the phone may be pulled (or fall) from between the springs, as no structure extends across the front of the phone.

U.S. Pat. No. 5,131,036 issued on Jul. 14, 1992 to Richard Dunchock, titled "Telephone Supporting Device," describes an assembly comprising a plate which is adhesively secured to the side of the central console, with another component which removably hooks to the plate. The removable component does not include any form of compartment or container for a cell phone or any other object. The only means of holding a phone or other object thereon, is by adhesively or mechanically affixing the object (or some other holder) to the flat upper surface of the removable component.

U.S. Pat. No. 5,305,381 issued on Apr. 19, 1994 to Chin Y. Wang et al., titled "Cradle For Telephone," describes a mechanically complex device having a pair of laterally opposed clamps releasibly secured to the phone by a ratcheting mechanism. No retaining means extends across the front of the phone, and the device is intended for permanent installation, considering the vehicle electrical power outlet therewith in one embodiment.

U.S. Pat. No. 5,741,530 issued on Nov. 28, 1995 to Stephen Chen, titled "Retaining Rack For A Cellular Phone Permitting Handfree Use Of Phone In Driving," describes a mechanically complex device which hooks within the window slot of a vehicle door. An arm assembly is provided to position the phone so the receiver is adjacent the user's mouth, with a complex audio pickup linkage securing to the hand set speaker to transmit the audio to a more powerful external speaker secured to the window slot bracket. The Chen device is quite cumbersome, and cannot be carried in a pocket or the like, as can the present phone holder. Moreover, the Chen device, as in the case of other devices described above, does not provide any positive retention of a phone therein by arms extending across the front of the holder.

U.S. Pat. No. 5,529,271 issued on Jun. 25, 1996 to Richard Dunchock, titled "Reversible Mount For A Telephone," describes a bracket which secures to one edge of a central console in a vehicle. A plate is hinged to the bracket, with one side of the plate having a mechanical phone attachment bracket thereon, and the opposite side having a panel of hook and loop fabric material thereon. The device of the Dunchock '271 U.S. Patent provides versatility in removably securing a cellular telephone thereto, but the device is semipermanently secured to the vehicle and cannot be readily removed, except by removing the threaded fasteners securing the device in the vehicle. Moreover, the device does not contain or surround the phone for security, as provided by the present cell phone holder invention.

U.S. Pat. No. 5,711,469 issued on Jan. 27, 1998 to Alfred E. Gormley et al., titled "Portable Phone Pouch, Mounting And Usage System," describes a generally rectangular pouch which is closed on five of its six sides, with one openable end for inserting and removing a cell phone therefrom. The Gormley et al. pouch has a flexible clear plastic window therein for actuating the phone's keypad, but the phone cannot be removed from the pouch by accessing it through an open frontal area, as in the case of the present cell phone holder. Moreover, the Gormley et al. pouch is clearly formed of a flexible material, as the disclosure describes its manufacture by folding, stitching, etc. The Gormley et al. pouch is primarily directed to various means for securing the pouch to various other articles (belt, sun visor, etc.).

U.S. Pat. No. 5,778,063 issued on Jul. 7, 1998 to Richard Dunchock, titled "Digital Recorder Reversible Mount For A Telephone," describes a device which is quite similar to that disclosed in the '271 U.S. Patent to the same inventor, discussed further above. The devices of both the '063 and '271 essentially comprise a flat plate having a hinge extending from one side for attachment to the edge of the central console or other area in a motor vehicle. One side of the plate has a bracket for hanging a cell phone thereon. The material of the opposite side of the plate of the device of the '063 U.S. Patent is not disclosed in that patent, but in any event, the flat, plate-like configuration of the device is completely unlike the present holder, which encloses the majority of a cell phone placed therein.

U.S. Pat. No. 5,833,100 issued on Nov. 10, 1998 to Dong-Joo Kim, titled "Cellular Phone Holder," describes various attachments for a cell phone pouch which essentially completely encloses a cellular phone stored therein. Kim describes two different types of attachment brackets for securing such cell phone pouches to a belt or the like, with the pouch either detachably or permanently affixed to the brackets. The brackets allow the phone to pivot or rotate slightly, to avoid damage to the phone and for the comfort of the user when seated. No disclosure of a relatively rigid case having an open front and surrounding the majority of a cell phone placed therein, is made in the Kim U.S. Patent.

U.S. Pat. No. 5,897,040 issued on Apr. 27, 1999 to Rod R. Ward, titled "Cellular Telephone Motorcycle Mounting Apparatus," describes a soft pouch type enclosure for a cell phone including a series of magnets on the back surface thereof. The pouch completely encloses the phone, unlike the present rigid holder. Moreover, the magnetic attachment means of the Ward device is inoperable with the typical plastic automobile interior.

U.S. Pat. No. D-316,999 issued on May 21, 1991 to Janice R. Sarff, titled "Holder For A Cellular Telephone," illustrates a design apparently formed of a pliable fabric material. The device is relatively open, but the upper and lower retainers completely encircle a phone therein, unlike the opposed arms of the present rigid holder structure. Moreover, the clip attachment on the back of the Sarff holder is unlike the hook and loop attachment material of the present cell phone holder invention.

U.S. Pat. No. D-320,022 issued on Sep. 17, 1991 to Katsuhito Watanabe, titled "Holder For A Portable Radio Telephone," illustrates a design comprising an apparently rigid upper portion having a wide back portion with a pair of opposed arms extending therefrom. A wire lower support extends from the upper portion, with a lower retainer formed in the center of the wire. No lower lateral arms are provided to hold the lower portion of the phone laterally, as provided by the present invention, and the Watanabe device with its two different media is considerably more costly to manufacture than the present monolithically cast phone holder.

U.S. Pat. No. D-320,992 issued on Oct. 22, 1991 to Bjorn Jondelius, titled "Mounting Bracket For A Telephone Handset To Be Mounted Upon The Dashboard Of A Motor Vehicle Or The Like," illustrates a design having an angled back plate with a pair of opposed arms, an upper arm, and a pair of lower arms extending therefrom. None of the arms extend around the forward portion of a phone seated therein, as provided by the present cell phone holder.

U.S. Pat. No. D-322,719 issued on Dec. 31, 1991 to Ali R. Jayez, titled "Carrying Case For A Portable Telephone," describes a case formed at least partially of a pliable material (as evidenced by the zipper closure and upper flap). The Jayez container completely encloses the front of the phone to prevent access thereto when the phone is secured in the case, whereas the present phone holder provides access to the front of a phone secured therein.

U.S. Pat. No. D-328,078 issued on Jul. 21, 1992 to Mark C. Jacobs, titled "Automobile Console Mountable Portable Cellular Phone Holder," illustrates a design comprising a generally trapezoid shaped sheet of material having oppositely extending flanges from two adjacent edges. The device bears a closer resemblance to the Dunchock '036 U.S. Utility Patent phone holder discussed further above, than to the present cell phone holder.

U.S. Pat. No. D-365,566 issued on Dec. 26, 1995 to Brian E. Cantrell, titled "Holder For Slim Line Type Cellular Telephone," illustrates a design having complete, solid opposed side walls extending from a solid back portion, rather than upper and lower lateral arms extending from a narrow back panel or spine, as in the present phone holder. Moreover, the Cantrell holder has a rearwardly extending hook for supporting the device, rather than using adhesive means on the back surface of the back portion, as is done with the present cell phone holder.

U.S. Pat. No. D-377,798 issued on Feb. 4, 1997 to Martin Heine, titled "Portable Telephone Holder," illustrates a design apparently comprising a cradle, with a back having a width at least that of the phone and opposed side members extending therefrom. A solid, continuous base or floor extends between the lower edges of the two side members and the back panel. The Heine phone holder apparently uses some form of mechanical clips to secure the phone within the holder, rather than the distal ends of the lateral arms which extend partially across the front of the phone, as in the present cell phone holder.

U.S. Pat. No. D-390,849 issued on Feb. 17, 1998 to Gary L. Richter et al., titled "Cellular Phone Holder," illustrates a design having a relatively thick, full width back with opposed and apparently laterally adjustable arms extending therefrom. The Richter et al. phone holder design thus bears a closer resemblance to the phone holders of the '381 and '530 U.S. Utility Patents issued respectively to Wang et al. and Chen, than to the present cell phone holder invention.

Japanese Patent Publication No. 10-179,233 published on Jul. 7, 1998 illustrates a completely enclosed case having a relatively complex attachment to a belt clip or the like. The device of the Japanese Patent Publication thus more closely resembles the cell phone holder of the '100 U.S. Utility Patent to Kim, than to the present cell phone holder invention.

Japanese Patent Publication No. 11-32,825 published on Feb. 9, 1999 apparently illustrates two different embodiments for a cell phone holder, with one comprising a clip which secures directly to the back of the phone and another comprising an enclosure with the clip secured to the back of the enclosure. The clips are spring loaded, belt type devices, rather than the hook and loop fabric material used for removably securing the present holder to another surface. In any event, the '825 Japanese Patent Publication does not disclose a phone holder having a rigid structure with an open front and sides, with opposed upper and lower arms extending about the majority of the phone held therein, as provided by the present cell phone holder invention.

Finally, European Patent Publication No. 933,737 published on Aug. 4, 1999, titled "Portable Electronic Device Holder," describes a flexible leather case providing complete enclosure for a cellular telephone contained therein. A belt attachment clip is provided. The device of the European Patent Publication thus more closely resembles the phone holder pouch of the Kim '100 U.S. Utility Patent or the phone holder of the '233 Japanese Patent Publication, both discussed further above, than the present cell phone holder invention.

None of the above inventions and patents, taken either singularly or in combination, is seen to describe the instant invention as claimed. Thus a cell phone holder for motor vehicles solving the aforementioned problems is desired.

SUMMARY OF THE INVENTION

The present invention comprises a holder or bracket for a cellular telephone, with the present holder providing convenient and removable mounting in a motor vehicle or elsewhere as desired. The present holder essentially comprises a rigid structure having a relatively narrow back portion or spine with opposed upper and lower lateral arms extending therefrom. The arms are open between their facing forward ends, to allow complete access to the cellular phone contained within the holder. The back of the holder includes one portion of hook and loop fabric material thereon, which removably attaches to another portion of mating material which is secured to another surface (automobile dash, etc.)

Accordingly, it is a principal object of the invention to provide a holder for a cellular telephone, for use in removably securing a cellular phone within a motor vehicle or the like for convenient access of the phone as desired.

It is another object of the invention to provide such a cell phone holder comprising a relatively narrow back or spine portion with laterally opposed upper and lower arms extending therefrom, with each of the arms extending forwardly along the sides of a phone placed therebetween and terminating in short extensions extending partially across the front of a phone placed therein, thereby providing access to a cell phone placed in the holder.

It is a further object of the invention to provide a cell phone holder including attachment means disposed upon the rear surface of the back or spine, with mating attachment means disposed upon another surface, the two attachment means providing convenient yet removable attachment of the holder to the other surface.

Still another object of the invention is to provide a cell phone holder preferably formed of a rigid plastic material, but which may be formed of metal or other suitable material as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a holder or bracket for holding a cellular telephone removably in place at a convenient location within a motor vehicle or other area as desired. The present holder is relatively open, permitting access to the keyboard and controls of the phone, while still retaining the phone securely in place. The use of a headset and appropriate lines or leads to the phone, permit the operation of a conventional hand held cell phone as a hands free phone, which is an important consideration when operating a motor vehicle.

Figure 1:
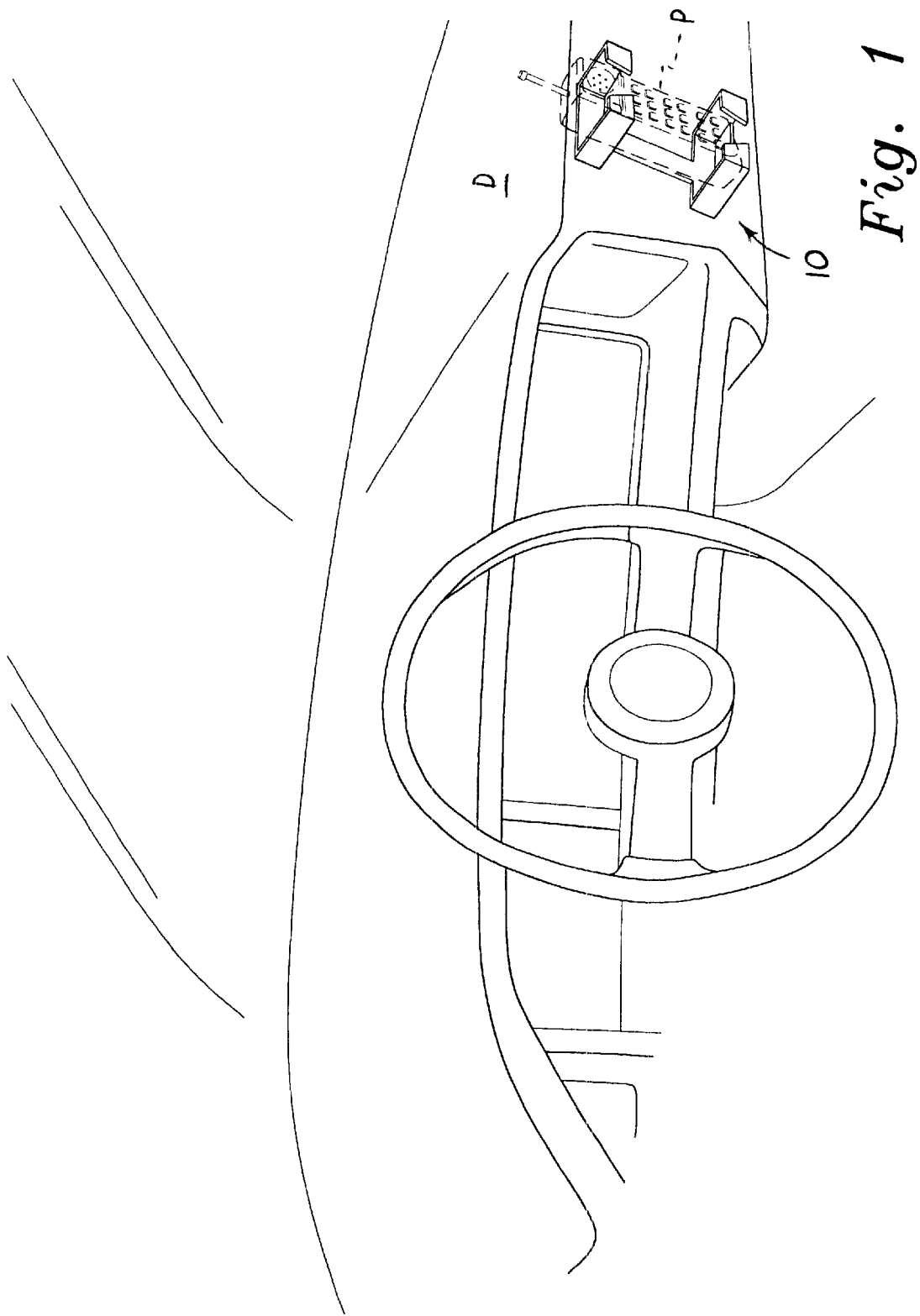
FIG. 1 is an environmental, perspective view of a cell phone holder for motor vehicles according to the present invention, showing its installation within a motor vehicle.

FIG. 1 provides an environmental perspective view of the present cell phone holder bracket 10 secured to the dash panel D of a conventional motor vehicle. (The cell phone P secured within the holder bracket 10 is shown in broken lines, in order to show the bracket 10 itself more clearly.) The holder or bracket 10 is removably secured to the dash D or other area as desired, thus allowing a user of the device to remove the bracket 10 and phone P held therein, for carriage and use outside the motor vehicle as desired.

Figure 2:
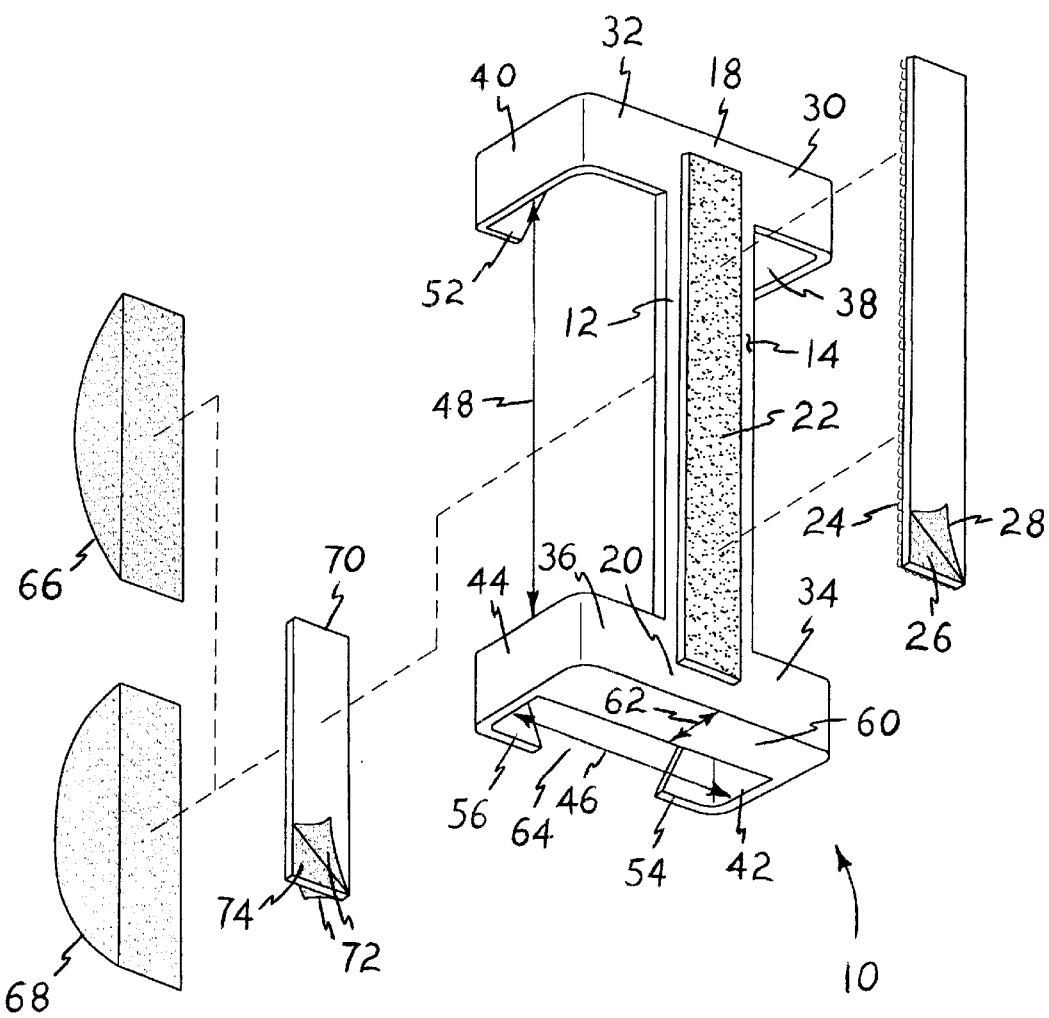
FIG. 2 is an exploded rear perspective view of the present cell phone holder, illustrating its components and attachment means.

FIG. 2 provides an exploded rear perspective view of the present holder or bracket 10, illustrating its various features in detail. The present cell phone holder bracket 10 includes a relatively narrow (i. e., narrower than the width of a cell phone P to be placed in the present bracket 10) central back panel or spine 12 having a rear surface 14, an opposite front surface 16 (shown more clearly in FIG. 3 of the drawings), an upper end 18, and an opposite lower end 20. The back or spine 12 serves as a central structure from which all other components of the present holder 10 extend, and also serves either directly or indirectly as a back or rear support for a cell phone P placed within the holder 10, as shown generally in FIG. 4 of the drawings.

The rear surface 14 of the back panel or spine 12 includes a first panel 22 of hook and loop fabric material (e. g., Velcro®) adhesively or otherwise permanently secured thereto. This attachment panel 22 mates removably with a complementary second panel 24 of hook and loop material, which is in turn adhesively or otherwise secured to a convenient surface for access by the phone user as desired.

The first and second panels 22 and 24 may include an adhesive coating 26 disposed upon their attachment surfaces (the thickness being exaggerated in the cross section of FIG. 4 for clarity in the drawing Figure), sealed by a release sheet 28 provided over the adhesive coating 26 until attachment to another surface is desired, as shown for the second hook and loop fabric panel 24 in FIG. 2. Other means for securing the present cell phone holder bracket 10 to another structure may be provided as desired, so long as the holder 10 is installed to provide for convenient and repeatable removability as desired.

An upper and a lower pair of laterally opposed arms, respectively first and second upper arms 30 and 32 and first and second lower arms 34 and 36, extend respectively to opposite sides of the upper and lower ends 18 and 20 of the rear panel or spine 12, and lie coplanar therewith. Each of the arms 30 through 36 has a side arm extension, respectively 38 through 44, extending forwardly therefrom, with corresponding extension pairs 38, 40 and 42, 44 each defining a lateral span 46 therebetween for embracing and laterally supporting the cellular phone P placed within the bracket or holder 10.

While the present cell phone holder or bracket 10 preferably includes two sets of lateral arms and extensions, i. e., an upper set and a lower set, it will be seen that the device could be constructed with only a single, relatively wide pair of opposed arms and extensions if desired. Such a single pair of opposed arms would require a relatively great vertical width or span, in order to provide the lateral stability to securely hold a cell phone therebetween. The present upper and lower arm and extension configuration accomplishes the same function, but by forming the extensions 38 through 44 with relatively short or narrow vertical extents or heights, considerably less than the length or height of the spine 12 of the device, a relatively large vertical span 48 is provided between each corresponding upper and lower side arm extension. This greatly facilitates manipulation of the cell phone placed therein, and extraction of the phone from the holder 10 as well.

Each of the extensions 38 through 44 has a laterally inwardly projecting forward retainer, respectively 50 through 56, extending therefrom, for supporting the forward surface of the phone P and capturing it between the retainers 50 through 56 and the opposite back panel or spine 12. The retainers are separate from one another, i. e., they do not interconnect laterally with one another across the front of the holder bracket 10. Rather, each corresponding pair of upper retainers 50, 52 and lower retainers 54, 56 define an open phone access passage or span 58 therebetween, thereby leaving the keypad and/or other controls on the front of the phone P completely unobscured and accessible even though the phone P may be installed within the holder 10, as shown in FIG. 1 of the drawings.

A floor or base 60 extends forwardly from the lower end 20 of the spine 12, to provide support for the base of a cell phone installed within the present holder bracket 10. The floor 60 extends laterally between the two lower side arm extensions 42 and 44, and thus has a width equal to the span 46 therebetween. However, the depth 62 or fore and aft dimension of the floor 60 is considerably shorter than the length of the side arm extensions, thus leaving an accessory passage 64 between the lower retainers 54 and 56 and the forward edge of the floor 60 for clearance of headset extension lines, external power cords, etc., while the cell phone P is installed within the holder bracket 10.

The present cell phone holder 10 may be constructed in virtually any practicable size or dimensions desired, to fit virtually any cell phone in existence. However, due to the multitude of different phones available, and moreover the vastly differing designer cases available for cell phones, it may be impracticable to attempt to construct cell phone holders in accordance with the present invention to precisely fit every type of cell phone available, or even the major brands and types available. Accordingly, some form of spacer means may be provided to adjust the interior space of the present cell phone holder 10 to accommodate cell phones which do not take up the entire width or depth (fore and aft dimension) of the holder 10.

Figure 3:
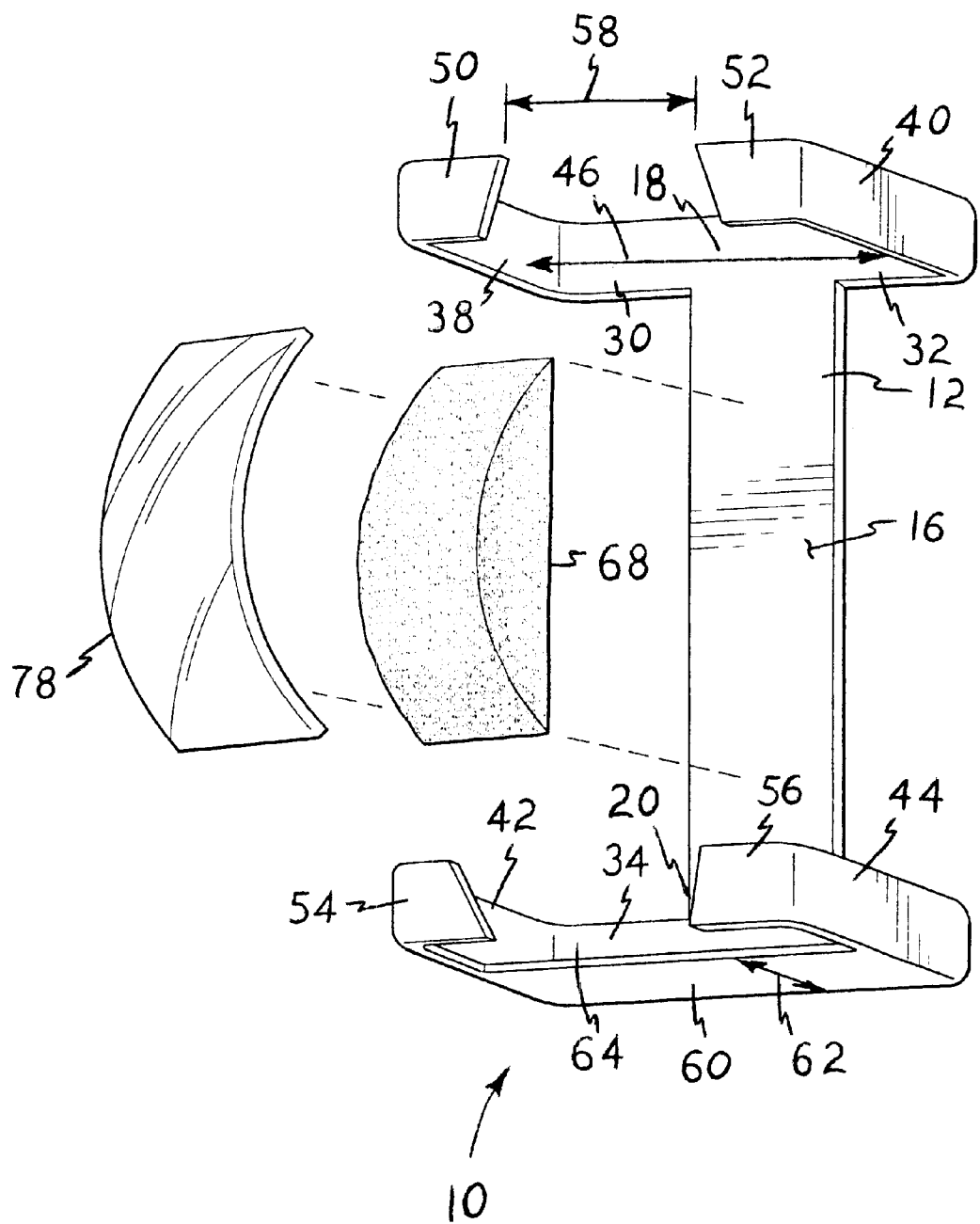
FIG. 3 is an exploded front perspective view, illustrating the installation of a spacer in the phone holder for a phone thinner than the thickness of the holder.
Figure 4:
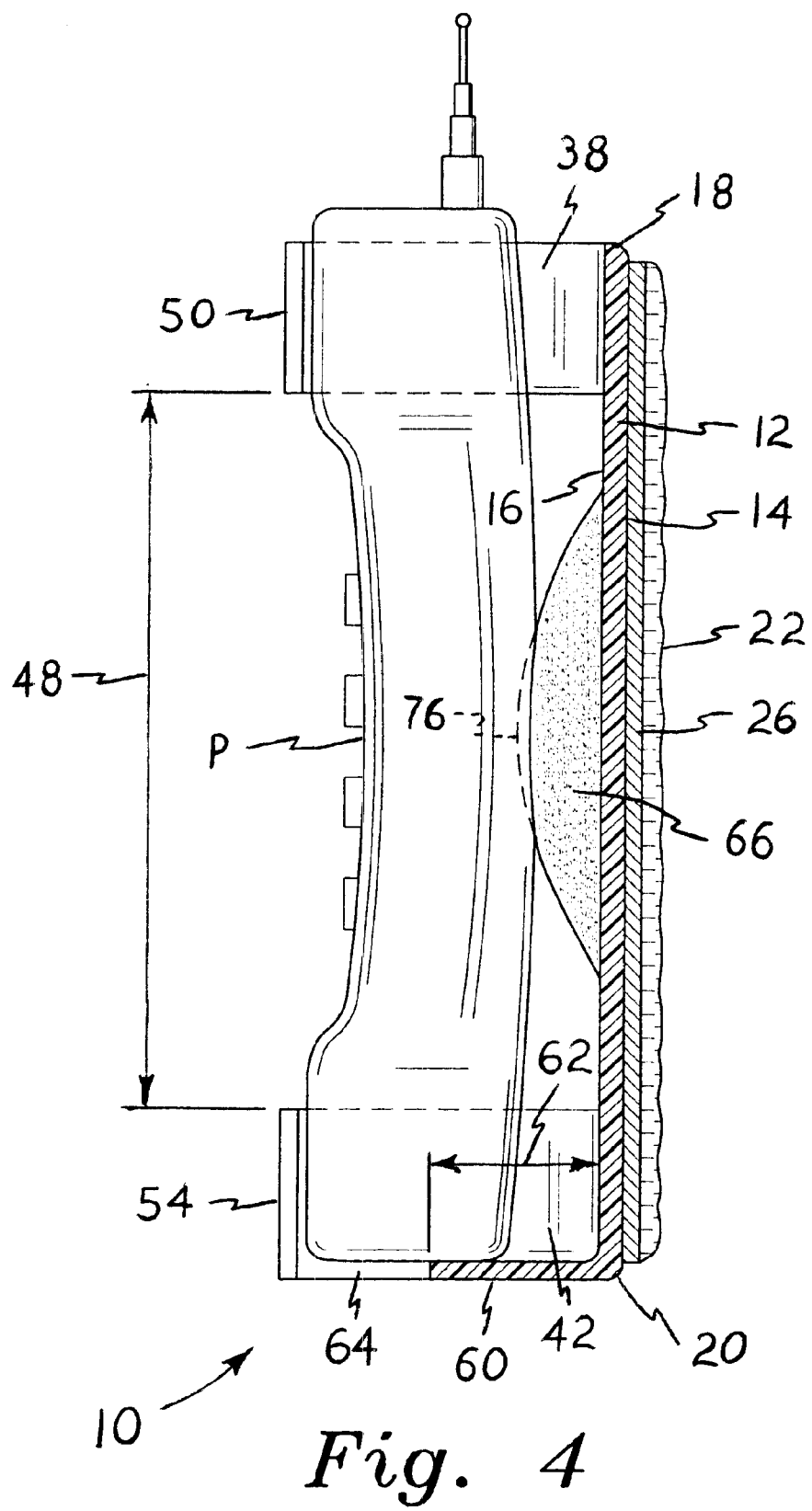
FIG. 4 is a side elevation view in section of the present cell phone holder, showing the retention of a cell phone within the holder by means of the spacer.

FIGS. 2 through 4 illustrate various spacer configurations which may be provided with the present phone holder 10. In FIG. 2, a pair of alternative spacers 66 and 68 is illustrated, with the selection of the thinner 66 or thicker 68 spacer being up to the purchaser or user of the holder 10, depending upon the size of the cell phone to be used with the holder 10. A double sided adhesive strip 70 may be provided with the holder 10 and spacers 66 and 68, with the user determining which spacer 66 or 68 to use, removing the release sheets 72 from the adhesive strip 70 to expose the adhesive coated surface 74 thereunder, applying the adhesive strip 70 to the front surface 16 of the back portion or spine 12 of the holder 10, and adhesively securing the selected spacer 66 or 68 to the front of the adhesive strip 70. Alternatively, the adhesive may be provided preapplied to one surface or another.

Such spacers 66, 68, etc. may be formed of a resilient material (e.g., open or closed cell foam, etc.) in order to compress slightly upon insertion of a cell phone into the holder. Alternatively, they may be formed of a relatively firm and incompressible material and secured to the front surface by means of a relatively thick adhesively backed foam strip, much like the strip 70 illustrated in FIG. 2. The resilience of the foam material thus disposed between the spacer and the underlying back or spine 12 of the holder 10, provides the required compliance to allow a cell phone having slightly greater thickness than the distance between the retainers 50 through 56 and the spine 12 of the holder 10, to be readily but firmly inserted into the holder 10.

The spacers 66, 68, etc. are preferably formed to have a smoothly contoured shape, as shown, to facilitate the insertion and removal of a cell phone P into and from the holder bracket 10, yet provide a firm grip upon the phone P while it is seated within the holder 10. The resiliency of the materials preferably used for the spacers 66, 68, etc. (or a relatively thick and resilient foam tape, as described further above) provides the required grip, as shown in FIG. 4 of the drawings where the uncompressed outline 76 of the spacer 66 is shown in broken lines and the spacer 66 has been compressed to fit closely against the back of the phone P to hold it securely in place within the holder 10. However, soft, resilient foam materials conventionally have a relatively high surface coefficient of friction, thereby making it difficult to slide even the smooth plastic surface of a cell phone past the spacer to seat the phone within the holder.

Accordingly, an overlay 78 of material having a low surface coefficient of friction (plastic tape, etc.) may be applied to the phone contact surface of the spacer, as shown in FIG. 3 for the spacer 68 being applied to the holder bracket of that drawing Figure. If harder materials having an inherently low surface coefficient of friction, e. g., harder plastics, etc., are used to form the spacer(s), then the use of such a low friction overlay strip 78 may not be necessary. It will be noted that such spacers of appropriate size may be applied to the inner walls of one or more of the side wall extensions 38 through 44 as desired, to provide an even better fit for the phone within the holder 10.

In conclusion, the present cellular telephone holder or bracket provides a convenient means for a person to secure an otherwise hand held cell phone within a motor vehicle or other area as desired. The present cell phone holder is also economical, preferably being formed of plastic, but alternatively formed of other reasonably sturdy materials (aluminum or other metal, etc.). The present holder provides full access to the keyboard and controls of such a phone through the generally open front area of the holder, essentially allowing the phone user to convert a hand held phone to a stationary installation. In consideration of ever increasing state and local laws prohibiting the use of a hand held cellular telephone by a vehicle operator while the vehicle is in motion, the present holder will prove to be a very desirable feature for persons owning cellular phones but who do not wish to expend further money on a dedicated, fixed location cell phone in one of their vehicles.

The present cell phone holder provides further advantages, in that its portability allows it to be quickly and easily removed from its attachment in the motor vehicle and carried (along with the phone therein) outside the vehicle. Moreover, the present cell phone holder may be easily transferred from one vehicle or area to another, merely by providing additional mating hook and loop fabric or other suitable mating attachment means at the desired location in the other vehicle(s) or area(s). Thus, the owner of the present cell phone holder avoids need for a series of separate cell phones in each vehicle he or she owns, yet meets the legal requirements of many areas by providing a fixed location in his or her motor vehicle(s) for a hand held cell phone.

It is to be understood that the present invention is not limited to the embodiment described above, but encompasses any and all embodiments within the scope of the following claims.

I claim:

1. A cell phone holder for a motor vehicle, comprising:
   a bracket including a back portion comprising a narrow spine having a length for rearwardly supporting a cellular phone placed within said bracket;
   said spine including a rearwardly disposed surface having means disposed thereon for removably securing said bracket to another structure;
   said spine further including a forwardly disposed surface, an upper end, and a lower end opposite said upper end;
   an upper pair of laterally opposed arms extending from said upper end of said spine and coplanar with said spine;
   a lower pair of laterally opposed arms extending from said lower end of said spine and coplanar with said spine;
   each of said arms having a height substantially less than said length of said spine;
   an upper side arm extension extending forwardly from each of said upper pair of laterally opposed arms and forming an upper opposed pair of extensions;
   a lower side arm extension extending forwardly from each of said lower pair of laterally opposed arms and forming a lower opposed pair of extensions;
   said upper opposed pair of extensions and said lower opposed pair of extensions each respectively defining a span for embracing and laterally supporting the cellular phone placed within said bracket;
   each corresponding said upper side arm extension and said lower side arm extension defining a vertical span therebetween;
   an upper forward retainer extending laterally inwardly from each said upper side arm extension and a lower forward retainer extending laterally inwardly from each said lower side arm extension, for forwardly supporting the cellular phone;
   each said upper retainer and each said lower retainer defining an open phone access passage therebetween;
   spacer means secured to said forwardly disposed surface of said spine, for partially filling said depth between each retainer and said spine and securely holding a cellular phone within said bracket, said spacer means comprising a smoothly contoured portion of resilient material having a low friction surface, and having an arcuately shaped cross-section; and
   a floor extending forwardly from said spine, for supporting a base of the cellular phone placed within said bracket.

2. The cell phone holder according to claim 1, wherein said means for removably securing said bracket to another structure comprises:
   a first panel of hook and loop fabric material disposed upon said rear surface of said spine;
   a second panel of hook and loop fabric material permanently secured to the other structure, and;
   said first panel and said second panel comprising mutually mating components for selectively attaching to and removing from one another.

3. The cell phone holder according to claim 1, wherein said floor has a lateral width substantially equal to said span of said upper opposed pair of extensions and said lower opposed pair of extensions and a depth substantially less than a length of each said side arm extension, for providing clearance for depending accessories from the cellular phone placed within said bracket.

4. The cell phone holder according to claim 1, wherein said bracket is formed of materials selected from the group consisting of plastic and metal.

* * * * *